July 28, 1959
M. R. DUPRES
2,896,389
GRASS TRIMMER
Filed Dec. 4, 1958
2 Sheets-Sheet 2
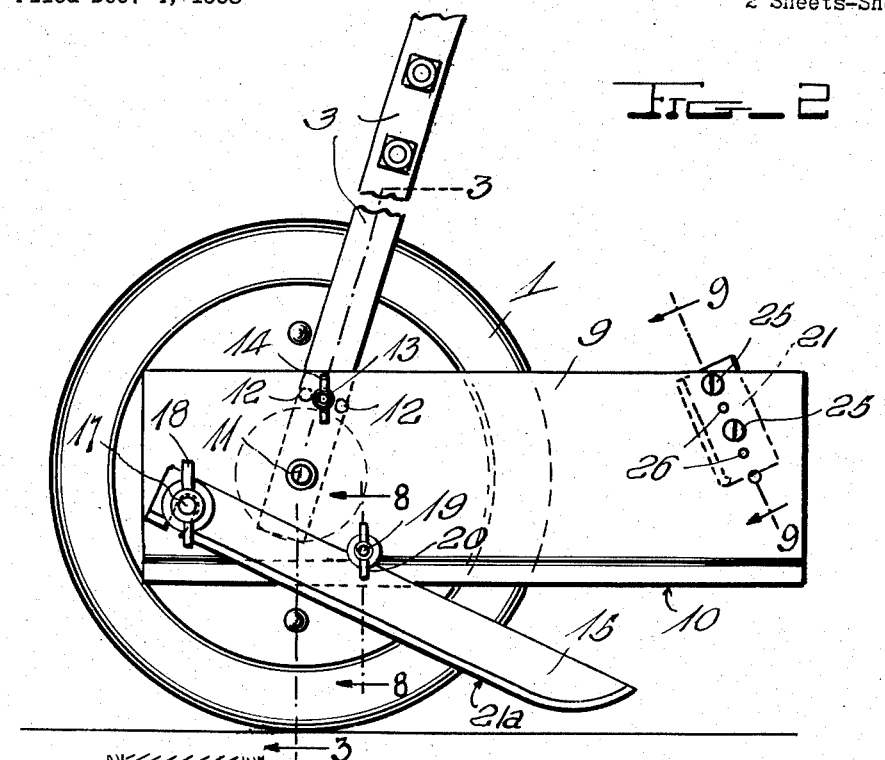
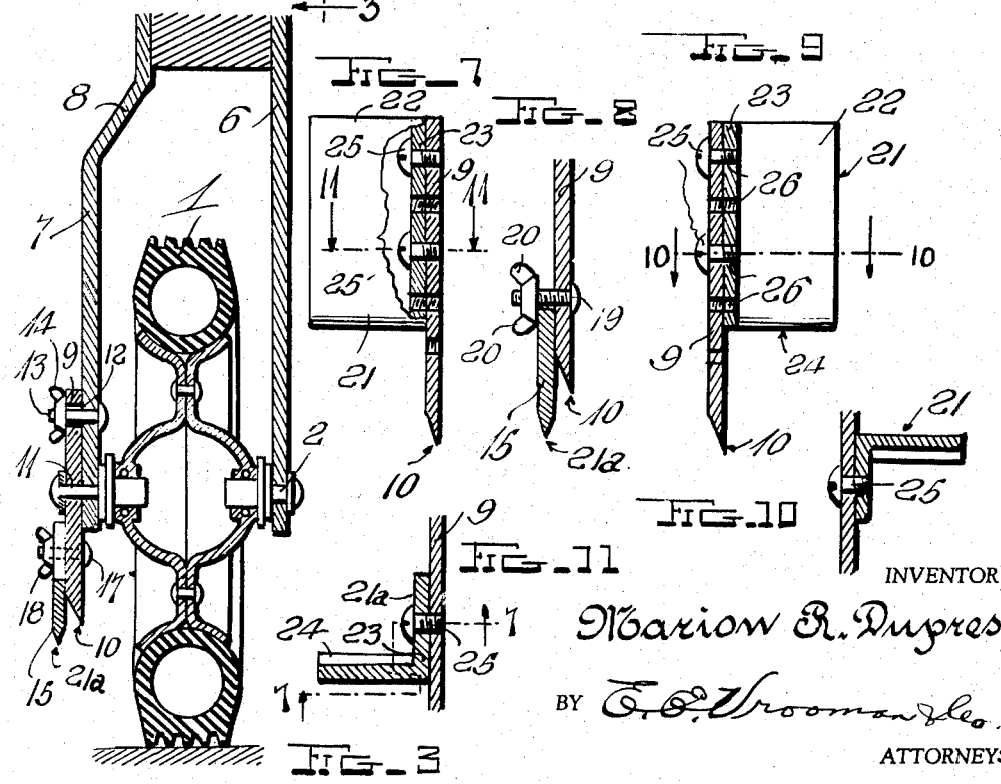
INVENTOR,
Marion R. Dupres,
BY
ATTORNEYS ated July 28, 1959

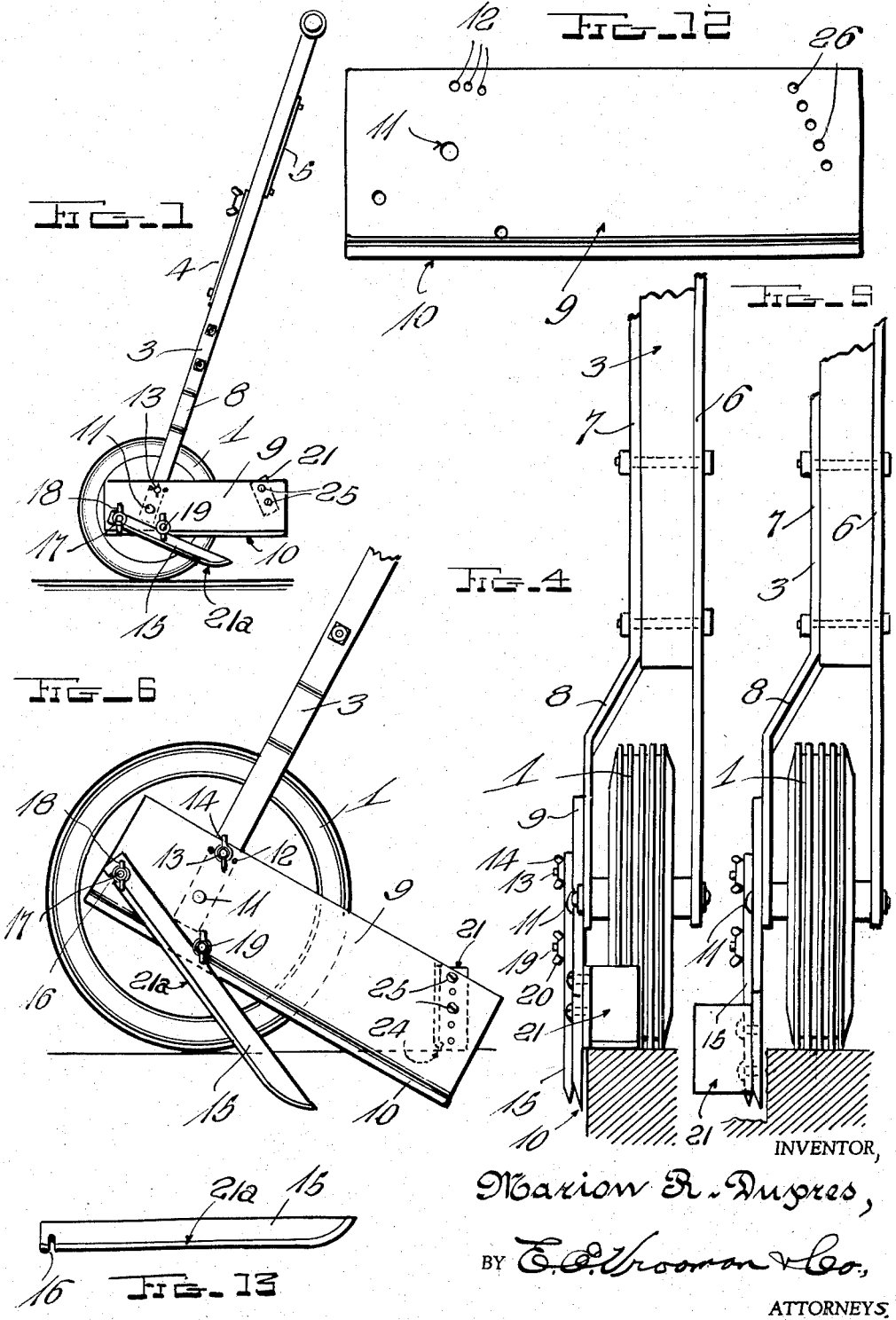

2,896,389
GRASS TRIMMER

Marion R. Dupres, Sarasota, Fla., assignor, by mesne assignments, to James J. Dennard and Margaret D. Dennard, Bradenton, Fla., as tenants by the entireties Application December 4, 1958, Serial No. 779,041

1 Claim. (Cl. 56—239)

This invention relates to a grass trimmer.

An object of this invention is to provide an efficient device for cutting off the grass or weeds growing over the sidewalk, and to trim around and even up the grass edges around flower beds, trees and plantings.

Another object of this invention is to provide a device which has several novel elements in combination, including a detachable knife, a guide and scraper, and the means mounting same, so that a unitary action is obtained, for the most satisfactory result.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Fig. 1 is a view in side elevation of a device constructed in accordance with this invention.

Fig. 2 is an enlarged view in side elevation, showing part of the handle broken away.

Fig. 3 is a sectional view taken on line 3—3, Fig. 2.

Fig. 4 is an enlarged fragmentary view of the device showing the guide and scraper on the inner face of the guide blade, while Fig. 5 is a similar view, only the guide and scraper is shown on the outside of the guide blade.

Fig. 6 is a view in side elevation of the device, showing same in its operation position.

Fig. 7 is a sectional view taken on line 7—7, Fig. 11.

Fig. 8 is a sectional view taken on line 8—8, Fig. 2.

Fig. 9 is a sectional view taken on line 9—9, Fig. 2, and looking in the direction of the arrows.

Fig. 10 is a sectional view, taken on line 10—10, Fig. 9, and looking in the direction of the arrows.

Fig. 11 is a fragmentary view of the guide and scraper and the guide blade.

Fig. 12 is a view in side elevation of the guide blade.

Fig. 13 is a side view of the detachable knife.

Referring to the drawing by numerals, 1 designates the rubber-tired wheel of the device, which wheel is suitably mounted at 2 upon the handle 3. On one side of the handle 3 is mounted an extra knife 4, and on the opposite side of said handle is mounted a sharpener 5, which may be of carbide steel.

The handle 3 comprises two sides 6 and 7. The side 7 is bowed out at 8, and against this side 7 is placed a guide blade 9 which moves along the surface adjacent the edge to be trimmed. This blade 9 has a sharpened lower edge 10. This blade 9 is pivotally mounted at 11, Fig. 3, on the side 7. Blade 9 is provided with aligned apertures 12, in one of which is bolt 13, Fig. 3. On bolt 13 is winged nut 14. Therefore, by these apertures and bolt the angle of the blade and handle can be adjusted.

An elongated knife 15 is provided with a notch 16 near its outer end, and in this notch 16 fits a bolt 17 that is provided on its outer end with a winged nut 18. This bolt 17 is mounted on guide blade 9. The upper edge of knife 15 bears against bolt 19, Fig. 8, and winged nut 20. By loosing nuts 18 and 20 the knife can be easily removed from the guide blade 9. This knife 15 has a sharp lower edge 21a, that does the cutting and edging. The guide blade 9 with its sharp edge 10, protrudes into the ground, Fig. 6. The guide blade 9 is made of tool steel so that it keeps its edge and also will bend when going around circular flower beds or around trees. The entire process is like a sharp knife being drawn down the edge to be cut by a powerful mechanical device which power is developed by the handle 3 being easily maneuvered along the edge of the sidewalk or the grass edges.

On the guide blade 9 is an adjustable depth guide and scraper 21. This guide and scraper 21 comprises an angular body of two parts 22 and 23. This device 21 has a dual purpose or function, namely, limits the depth of the blades going down into the ground, and also scrapes off the grass that is cut along the sidewalk. This is when it is mounted so that it is behind the wheel 1, Fig. 4. By simply removing the bolts 25 the guide and scraper is put on the other side of the guide blade 9, where it digs out and loosens the grass edges cut when being used around flower beds and lawn edges. As shown in Fig. 6, the inwardly-curved projecting edge or finger 24 of part 22 rides on top of the ground, performing the function of an efficient scraper. Part 23 is secured against blade 9 by threaded bolts 25. The part 23 is shown with four apertures 26, Fig. 9. By the bolts 25 being in any two of the apertures 26, the position of said device 21 on blade 9 can be changed. Hence, it will be appreciated that device 21 is adjustably mounted on blade 9.

One of the advantages of my invention is that the sharp cutting edge of the knife can be readily maintained by easily detaching and resharpening, using the sharpener 5, Fig. 1, provided for that purpose. This includes the cutting edges 10 and 21a.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a device of the character described, in combination, a handle, a wheel rotatably mounted on said handle, a unitary guide blade pivotally mounted on said handle, said blade having a plurality of spaced substantially horizontally aligned apertures near its upper edge, a bolt extending through said handle selectively positionable in one of said apertures to position said blade in a selected angular relationship to said handle, a wing nut securing said bolt in a selected aperture, a knife pivotally mounted adjacent the forward lower corner of said blade, a scraper and stop device adapted for vertical engagement with the ground adjustably mounted on said blade, said guide blade having a row of aligned spaced apertures extending angularly across the upper rear corner portion thereof, and bolt means carried by said scraper selectively engageable with said last-mentioned apertures for adjusting the position of said scraper and stop to vary the depth of penetration of said guide into the ground.

References Cited in the file of this patent

UNITED STATES PATENTS

| | | |
|---|---|---|
| 771,530 | Card | Oct. 4, 1904 |
| 861,304 | Motherwell | July 30, 1907 |
| 1,154,839 | Bigford | Sept. 28, 1915 |
| 1,179,178 | Hall | Apr. 11, 1916 |
| 1,531,156 | Thissen | Mar. 24, 1925 |
| 1,754,837 | Scullin | Apr. 15, 1930 |
| 2,052,154 | Wingard | Aug. 25, 1936 |
| 2,752,841 | LaPlante | July 3, 1956 |

FOREIGN PATENTS

| | | |
|---|---|---|
| 580,739 | France | Sept. 8, 1924 |